US008076896B2

(12) United States Patent
Yamamoto et al.

(10) Patent No.: US 8,076,896 B2
(45) Date of Patent: Dec. 13, 2011

(54) INVERTER CONTROLLER AND METHOD FOR OPERATING THE SAME

(75) Inventors: Yoichi Yamamoto, Kitakyushu (JP); Kazuhiro Nonaka, Kitakyushu (JP); Masaki Nakai, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 415 days.

(21) Appl. No.: 12/306,650

(22) PCT Filed: May 29, 2007

(86) PCT No.: PCT/JP2007/060920
§ 371 (c)(1),
(2), (4) Date: Dec. 24, 2008

(87) PCT Pub. No.: WO2008/001572
PCT Pub. Date: Jan. 3, 2008

(65) Prior Publication Data
US 2009/0230903 A1     Sep. 17, 2009

(30) Foreign Application Priority Data

Jun. 28, 2006 (JP) .................................. 2006-178124
Aug. 9, 2006 (JP) .................................. 2006-216779

(51) Int. Cl.
*H02P 3/18* (2006.01)
*H02P 8/24* (2006.01)

(52) U.S. Cl. .................. 318/801; 318/805; 318/400.07; 361/23; 361/30; 363/34; 363/56.03

(58) Field of Classification Search .................. 318/805, 318/798, 808, 762, 800, 811, 400.07, 400.14, 318/400.17, 801; 363/34, 35, 37, 40, 41, 363/51, 123, 131, 56.03; 361/23, 30
See application file for complete search history.

(56) References Cited

U.S. PATENT DOCUMENTS

| 4,625,159 | A | * | 11/1986 | Ikejima | 318/811 |
|---|---|---|---|---|---|
| 4,713,595 | A | * | 12/1987 | Yonemoto | 318/759 |
| 5,136,494 | A | * | 8/1992 | Akagi et al. | 363/34 |
| 7,057,361 | B2 | * | 6/2006 | Kitahata et al. | 318/139 |
| 7,317,292 | B2 | * | 1/2008 | Iura et al. | 318/434 |
| 7,791,309 | B2 | * | 9/2010 | Hwang et al. | 318/807 |
| 7,800,338 | B2 | * | 9/2010 | Iura et al. | 318/801 |
| 2004/0008530 | A1 | * | 1/2004 | Kitahata et al. | 363/131 |
| 2007/0216328 | A1 | * | 9/2007 | Iura et al. | 318/362 |

(Continued)

FOREIGN PATENT DOCUMENTS

JP     04079734  A  *  3/1992

(Continued)

*Primary Examiner* — Walter Benson
*Assistant Examiner* — Eduardo Colon Santana
(74) *Attorney, Agent, or Firm* — Sughrue Mion, PLLC (57) ABSTRACT

An inverter controller comprising an AC motor as a load. A rectifying circuit converts AC power from an AC power source into DC power. A smoothing capacitor smoothens a DC voltage from the rectifying circuit. An inverter circuit converts DC power supplied via the smoothing capacitor into a desired frequency. A current detection circuit detects a output current of the inverter circuit. A voltage detection circuit detects a terminal voltage (Vpn) of the smoothing capacitor. A voltage command calculation circuit calculates a voltage command to the AC motor. A speed command calculation circuit calculates a speed command to be used when it is determined that the AC power source is in a power failure state or when the terminal voltage (Vpn) reaches a certain value.

8 Claims, 8 Drawing Sheets

U.S. PATENT DOCUMENTS

| | | | |
|---|---|---|---|
| 2007/0216340 A1* | 9/2007 | Iura et al. | 318/801 |
| 2009/0021198 A1* | 1/2009 | Okamura et al. | 318/400.3 |
| 2009/0102412 A1* | 4/2009 | Hwang et al. | 318/707 |

FOREIGN PATENT DOCUMENTS

| | | | |
|---|---|---|---|
| JP | 6-165579 A | 6/1994 |
| JP | 09-247990 A | 9/1997 |
| JP | 3095083 B2 | 8/2000 |
| JP | 3201460 B2 | 6/2001 |
| JP | 2002-171792 A | 6/2002 |
| JP | 3536695 B2 | 3/2004 |
| WO | WO 2005096489 A1 * | 10/2005 |

\* cited by examiner

FIG. 8
PRIOR ART

INVERTER CONTROLLER AND METHOD FOR OPERATING THE SAME

TECHNICAL FIELD

The present invention relates to an inverter controller for variably speed controlling an AC motor, and more particularly, to an inverter controller and a method for operating the inverter controller, enabling continuous operation during an instantaneous power failure and capable of dealing with regenerated energy during the deceleration of an AC motor and the operation of the AC motor under a regenerative load.

BACKGROUND ART

In the case of a first conventional inverter controller, according to the operation method thereof during an instantaneous power failure, an AC motor is decelerated when the terminal voltage (intermediate voltage) of a smoothing capacitor lowers to level 1 or less, the AC motor is accelerated when the intermediate voltage rises to level 2 or more due to the regenerated power obtained by deceleration, and acceleration/deceleration control is repeated subsequently depending on the increase or decrease of the intermediate voltage as described above, whereby the drop rate of the intermediate voltage is reduced (for example, refer to Patent document 1).

In the case of a second conventional inverter controller, the inverter controller starts deceleration using a power failure detection signal, calculates deceleration rate 1 on the basis of the target value and the detection value of a DC intermediate voltage so that the DC intermediate voltage becomes constant during deceleration, calculates deceleration rate 2 on the basis of the change rate of the DC intermediate voltage and controls the deceleration time by proportionally integrating the value obtained by multiplying the two deceleration rates, thereby stopping the deceleration when the DC intermediate voltage reaches the voltage before power failure detection or rises during deceleration (for example, refer to Patent document 2).

In the case of a third conventional inverter controller, the voltage value of the main circuit (corresponding to the terminal voltage value of the smoothing capacitor) rises when the output frequency is lowered and the motor is decelerated; the deceleration time of the motor is controlled depending on the detected voltage value of the main circuit such that when the voltage detection value is higher than a predetermined first voltage value, the deceleration time is lengthened, and such that when the voltage detection value reaches a second voltage value higher than the first voltage value, the deceleration is stopped (for example, refer to Patent document 3).

In the case of a fourth conventional inverter controller, when a regenerative load is applied during motor operation and the detected DC voltage (corresponding to the terminal voltage value of the smoothing capacitor) exceeds a reference value, the output frequency to be raised is obtained by multiplying the difference between the detected DC voltage value and the reference value by a constant proportional gain, and control is performed to raise the output frequency (for example, refer to Patent document 4).

Figure 8:
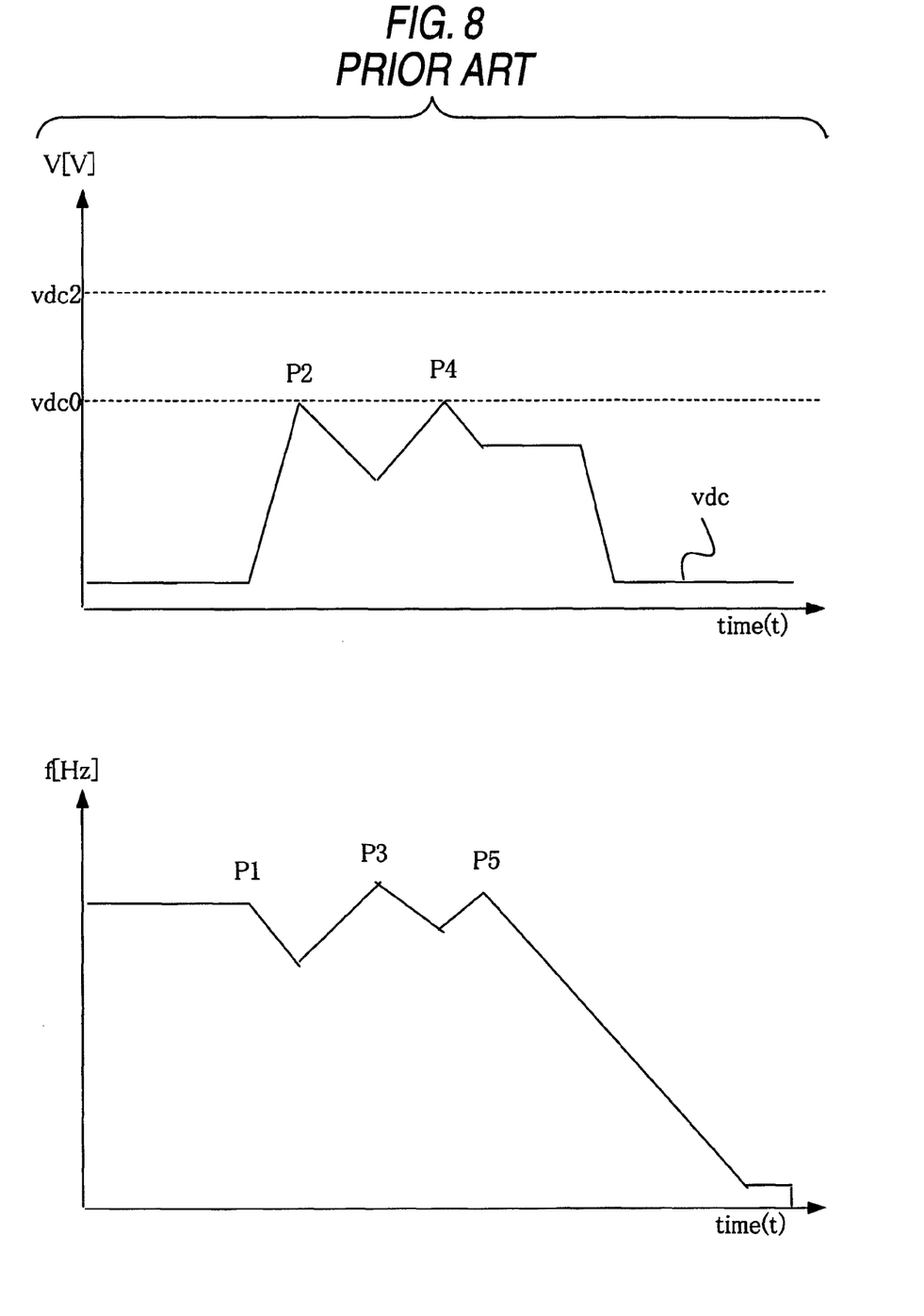
FIG. 8 is a time chart illustrating the operation of the prior art.

FIG. 8 is a view showing the operation of the fourth conventional inverter controller for driving an AC motor when it is used, for example, under a load condition in which regenerated energy increases at the bottom dead center of a pressing machine. In the figure, f designates an output frequency, Vdc designates a DC bus voltage, Vdc0 designates a DC bus voltage stalling level, and Vdc2 designates an overvoltage level.

When the output frequency f is lowered (at p1) using a deceleration command and the motor is decelerated, the DC bus voltage Vdc is raised by the regenerated energy from the motor. When the DC bus voltage Vdc becomes the DC bus voltage stalling level Vdc0 or more (at p2 and p4), the output frequency f is raised to prevent an overvoltage trip. Since the output frequency f is raised, the regenerated energy is reduced; when the DC bus voltage Vdc is lowered and becomes the DC bus voltage stalling level Vdc0 or less (at p3 and p5), the deceleration command is executed again.

In the operation methods for the conventional inverter controllers during an instantaneous power failure, the motor is driven for regenerative operation by adjusting a speed command or by determining a deceleration rate on the basis of the level of the terminal voltage (intermediate voltage) of a smoothing capacitor or the operation of a power failure detection circuit.

Furthermore, in the operation methods for the conventional inverter controllers at the time when the DC bus voltage is raised to a predetermined voltage or more by the regenerated energy during the deceleration of the AC motor and the operation of the AC motor under a regenerative load, the step of lengthening the deceleration time, stopping the deceleration or raising the output frequency depending on the level of the DC bus voltage is repeated to suppress the DC bus voltage from rising, whereby an overvoltage trip is prevented.

Patent document 1: Unexamined Japanese Patent Application Publication No. Hei 6-165579

Patent document 2: Japanese Patent No. 3201460

Patent document 3: Japanese Patent No. 3095083

Patent document 4: Japanese Patent No. 3536695

DISCLOSURE OF THE INVENTION

Problems to be Solved by the Invention

In the operation methods for the conventional inverter controllers, the terminal voltage level of the smoothing capacitor is detected, and the deceleration time and the output frequency are controlled depending on the voltage level; hence, in the case that the methods are applied to a system in which the load applied to the AC motor to be driven changes, it is difficult to determine the control amount of the output frequency; if the change in output frequency is slow, a trip occurs at undervoltage or overvoltage, or there occurs a problem in which deceleration and acceleration are repeated and vibration is generated in the motor. In particular, in the case that the methods are applied to a system having low mechanical rigidity or an inverter controller provided with a smoothing capacitor having a reduced capacitance, the up/down change in the DC bus voltage (Vpn) is steep; hence, the above-mentioned problems occur prominently.

In consideration of these problems, an object of the present invention is to provide an inverter controller and a method for operating the inverter controller, enabling continuous operation without requiring difficult adjustments and without causing a trip at overvoltage or undervoltage during an instantaneous power failure or during the deceleration of an AC motor and the operation of the AC motor under a regenerative load even in the case that the present invention is applied to a system having low mechanical rigidity or an inverter controller provided with a smoothing capacitor having a reduced capacitance.

Means for Solving the Problems

To solve the above-mentioned problems, the present invention is configured as described below.

According to claim 1 of the present invention, there is provided an inverter controller including:

an AC motor as a load, a rectifying circuit for converting AC power from an AC power source into DC power, a smoothing capacitor for smoothing a DC voltage from the rectifying circuit, an inverter circuit for converting DC power supplied via the smoothing capacitor into a desired frequency, a current detection circuit for detecting the output current of the inverter, a voltage detection circuit for detecting the terminal voltage of the smoothing capacitor, a power calculation circuit for calculating the power output value of the inverter controller, and a speed command calculation circuit for calculating a power output target value on the basis of the terminal voltage and the power output value, and for calculating a speed command used during an instantaneous power failure on the basis of the power output target value and the power output value or a speed command depending on the output value of the voltage detection circuit.

According to claim 2 of the present invention, there is provided the inverter controller according to claim 1, wherein the speed command calculation circuit calculates to correct the power output target value by adding or subtracting the power loss value of the inverter controller on the basis of the sign of the power output value.

According to claim 3 of the present invention, there is provided the inverter controller according to claim 1, wherein the speed command calculation circuit calculates to correct the power output target value by adding or subtracting the power loss value of the machine including the AC motor on the basis of the sign of the power output target value.

According to claim 4 of the present invention, there is provided the inverter controller according to claim 1, wherein the speed command calculation circuit calculates to correct a torque target value by calculating the torque target value using the deviation between the power output target value and the power output value and the speed command output at the last time.

According to claim 5 of the present invention, there is provided the inverter controller according to claim 1, wherein the speed command calculation circuit limits the torque target value that is obtained on the basis of the power output target value and the speed information of the AC motor.

According to claim 6 of the present invention, there is provided the inverter controller according to claim 1, wherein the speed command calculation circuit calculates a slip speed command by calculating the slip speed command using the torque target value that is obtained on the basis of the power output target value and the speed information of the AC motor in the case that the AC motor is an induction motor.

According to claim 7 of the present invention, there is provided the inverter controller according to any one of claims 1 to 6, further including:

a frequency command calculation circuit for calculating the frequency command of the AC motor instead of the speed command calculation circuit.

Furthermore, to solve the above-mentioned problems, the present invention is configured as described below.

According to claim 8 of the present invention, there is provided an operation method for coping with the fluctuation or instantaneous power failure of an AC power source for an inverter controller including: an AC motor as a load, a rectifying circuit for converting AC power from an AC power source into DC power, a smoothing capacitor for smoothing a DC voltage from the rectifying circuit, an inverter circuit for converting DC power supplied via the smoothing capacitor into a desired frequency, a current detection circuit for detecting the output current of the inverter, and a voltage detection circuit for detecting the terminal voltage of the smoothing capacitor, the operation method including the steps of:

calculating the power output value of the inverter controller, calculating the power output target value on the basis of the terminal voltage and the power output value, and calculating a speed command used during an instantaneous power failure on the basis of the power output target value and the power output value or a speed command depending on the output value of the voltage detection circuit.

EFFECT OF THE INVENTION

With the present invention according to claims 1 to 8, a loop for controlling the power output of the inverter controller can be configured inside a loop for determining a deceleration command on the basis of the target voltage and the detection voltage across the terminals of the smoothing capacitor 2, and the target value of the terminal voltage of the smoothing capacitor can be converged rapidly.

Furthermore, with the present invention according to claim 2, the power loss value of the inverter controller can be taken into consideration, and with the present invention according to claim 3, the power loss value of the machine including the AC motor can be taken into consideration; hence, even in the state that the target voltage and the detection voltage across the terminals of the smoothing capacitor are coincident with each other, smooth deceleration operation can be performed, and unnecessary deceleration stop and deceleration are not repeated.

Moreover, with the present invention according to claim 5, excessive torque generation can be prevented by limiting the torque target value, whereby a machine to be used can be protected.

Still further, with the present invention according to claim 6, slip frequency can be compensated in the case that the AC motor serving as a load to be used is an induction motor, whereby the delay time until the planned regenerative electric power is obtained can be shortened.

EXPLANATIONS OF LETTERS AND NUMERALS

1 rectifying circuit
2 smoothing capacitor
3 inverter circuit
4 current detection circuit
5 voltage detection circuit
6 speed command selection circuit
7 speed command calculation circuit
8 voltage command calculation circuit
9 PWM control circuit
10 base drive circuit
11 electromagnetic contactor
12 speed command setter
13 AC motor
20, 20' inverter controller
21 switch circuit
22 soft starter
23 OR circuit
24 comparator
25, 31, 32, 61, 62, 63 coefficient multiplier
34 energy target value calculation circuit
35 energy calculation circuit
36 power calculation circuit
37, 60 subtracter
40 adder-subtracter
49 delay circuit
52 divider
53 torque limiting circuit
58 slip calculation circuit
59, 64 adder
70 sequence circuit
71 frequency command calculation circuit
72 frequency command setter
73 switch circuit
74 comparator
75, 76, 77, 82, 85, 88 coefficient multiplier
78 energy target value calculation circuit
79 energy calculation circuit
80, 91 subtracter
81 power calculation circuit
83 limit circuit
84 adder-subtracter
86 divider
87 torque limiting circuit
89, 90 adder
92 slip calculation circuit
93 delay circuit
a power failure detection contact signal
b power-failure-time speed command
c speed command
d output voltage command
e output current detection
f power failure detection signal
g normal-time speed command

BEST MODE FOR CARRYING OUT THE INVENTION

Embodiments according to the present invention and specific examples of methods according to the present invention will be described below on the basis of the drawings.

Embodiment 1

Figure 1:
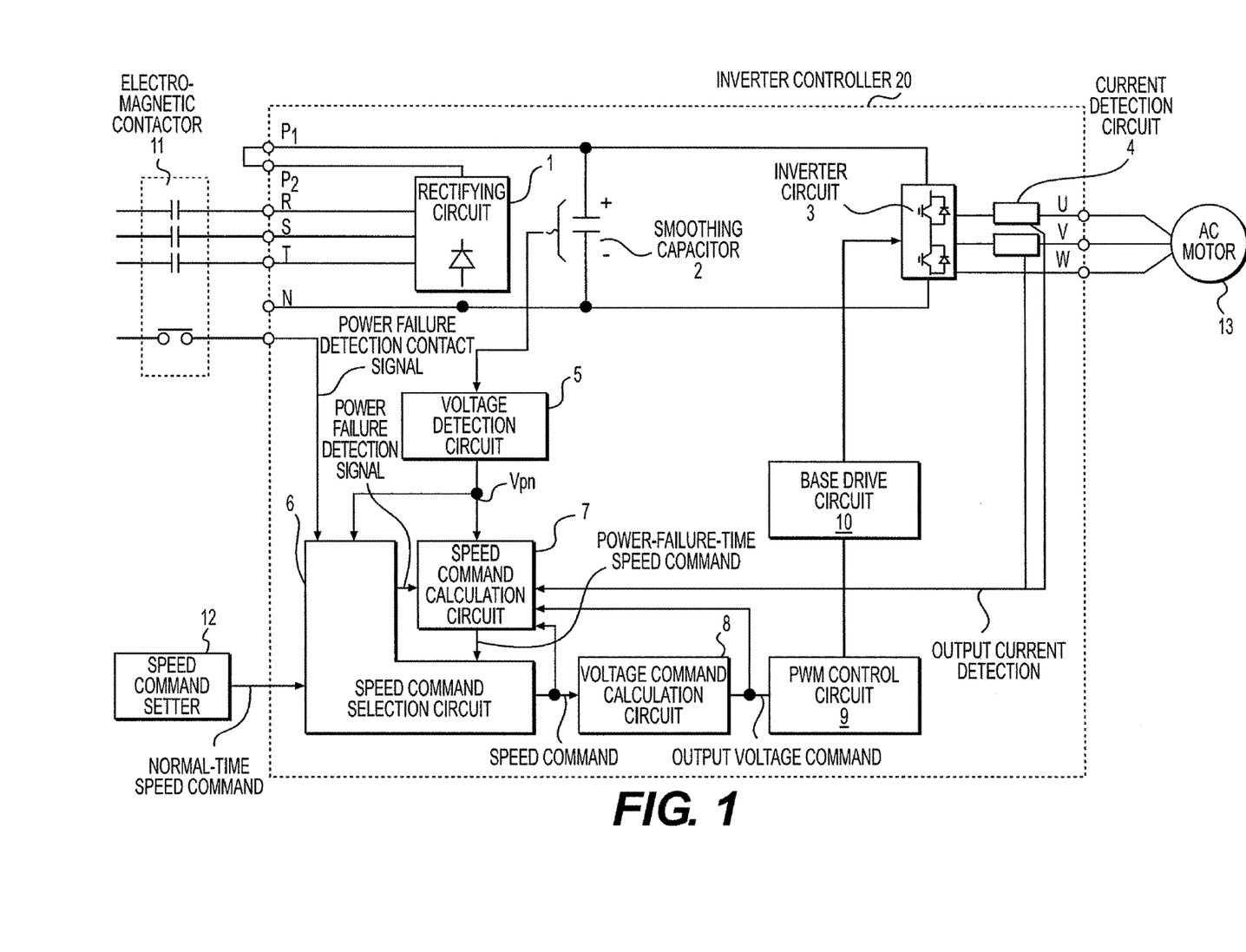
FIG. 1 is an outline configuration diagram showing the whole of an inverter controller according to a first embodiment of the present invention.

FIG. 1 is an outline configuration diagram showing the whole of an inverter controller according to the present invention. In FIG. 1, numeral 1 designates a rectifying circuit for converting the AC power from an AC power source into DC power, numeral 2 designates a smoothing capacitor for smoothing the DC voltage from the rectifying circuit 1, numeral 3 designates an inverter circuit for converting the DC power supplied via the smoothing capacitor 2 into a desired frequency, numeral 4 designates a current detection circuit for detecting the output current of the inverter circuit, numeral 5 designates a voltage detection circuit for detecting the terminal voltage of the smoothing capacitor 2, numeral 6 designates a speed command selection circuit for selecting a speed command depending on whether a power failure state has occurred, numeral 7 designates a speed command calculation circuit for calculating a speed command during power failure detection, numeral 8 designates an output voltage command calculation circuit for calculating an output voltage command on the basis of the speed command delivered from the speed command selection circuit 6, numeral 9 designates a PWM control circuit for PWM controlling the inverter circuit 3 on the basis of the output signal delivered from the speed command selection circuit 6, and numeral 10 designates a base drive circuit for driving the inverter circuit 3 on the basis of the output signal from the PWM control circuit 9; the inverter controller comprises these components.

Numeral 11 designates an electromagnetic contactor on the AC power source side, numeral 12 designates a speed command setter for setting the speed command during normal operation, and numeral 13 designates an AC motor driven by the output of the inverter circuit 3; these components are connected to the inverter controller 20.

The present invention is different from the prior art in that the speed command selection circuit 6 for selecting a speed command depending on whether a power failure state has occurred and the speed command calculation circuit 7 for calculating the power-failure-time speed command are provided; the speed command calculation circuit 7 is provided with a loop for controlling the power output of the inverter controller 20 inside a loop for determining a deceleration command on the basis of the target voltage Vpnc and the detection voltage Vpn of the smoothing capacitor 2, and is further provided with a torque limiting circuit 53 for limiting a torque target value and other circuits.

Figure 2:
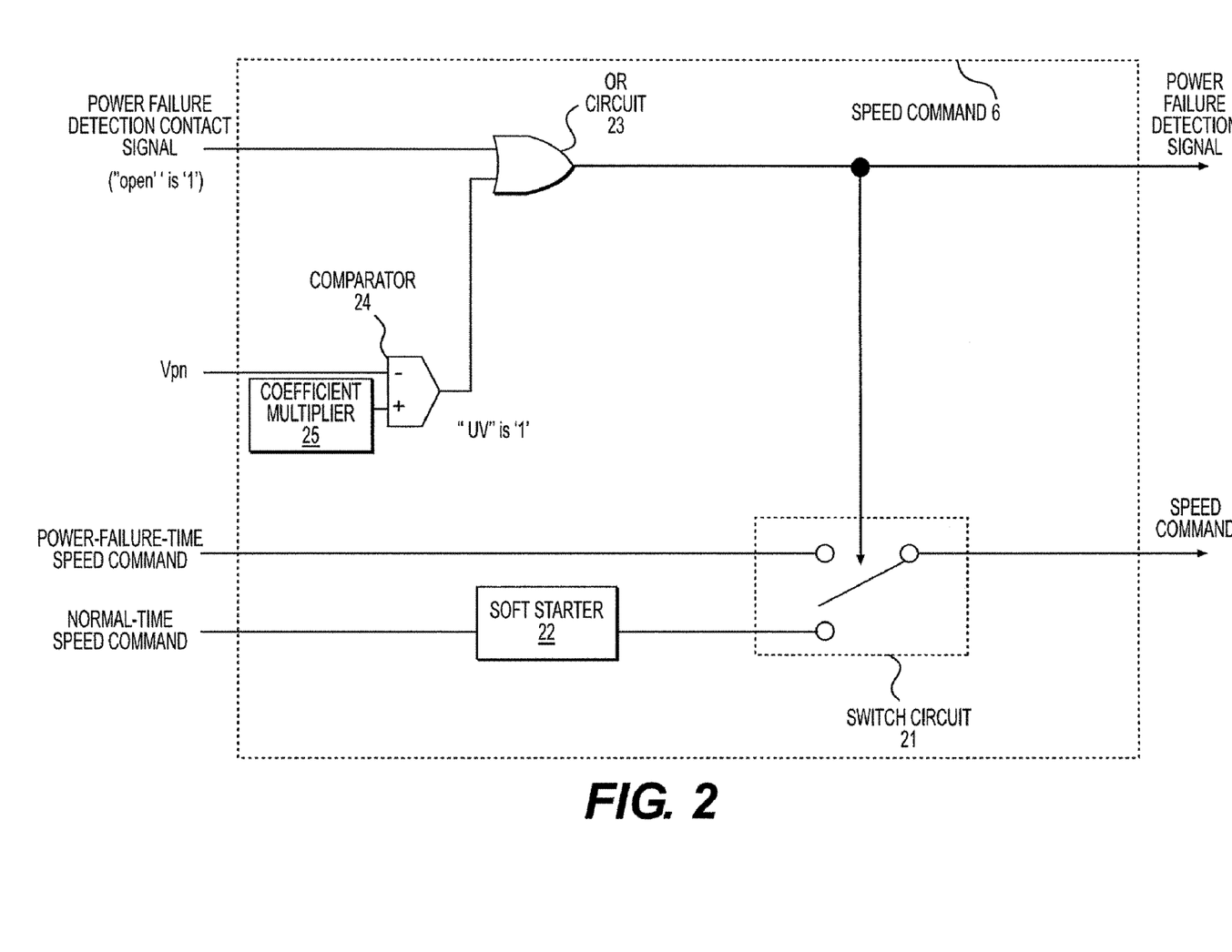
FIG. 2 is a block diagram of a speed command selection circuit 6 for selecting a speed command during power failure detection according to the first embodiment of the present invention.

FIG. 2 is a block diagram of the speed command selection circuit 6 for selecting a speed command depending on whether a power failure state has occurred. In FIG. 2, the speed command selection circuit 6 has a switch circuit 21, a soft starter 22, an OR circuit 23, a comparator 24 and a coefficient multiplier 25 for setting UV level 1, delivers the output signal of the OR circuit 23 for calculating the logical OR of the power failure detection contact signal from the electromagnetic contactor 11 and the output signal of the comparator 24 described later as a power failure detection signal to the speed command calculation circuit 7, and further delivers, to the speed command calculation circuit 7 and the voltage command calculation circuit 8, a speed command selected by activating the switch circuit 21 and by carrying out switching between the power-failure-time speed command from the speed command calculation circuit 7 and the normal-time speed command from the speed command setter 12 via the soft starter 22.

The comparator 24 compares the terminal voltage Vpn of the smoothing capacitor 2 from the voltage detection circuit 5 with the output of the coefficient multiplier 25, and the comparator 24 outputs a UV (undervoltage) signal "1" when the terminal voltage Vpn is lower than the output of the coefficient multiplier 25.

Figure 3:
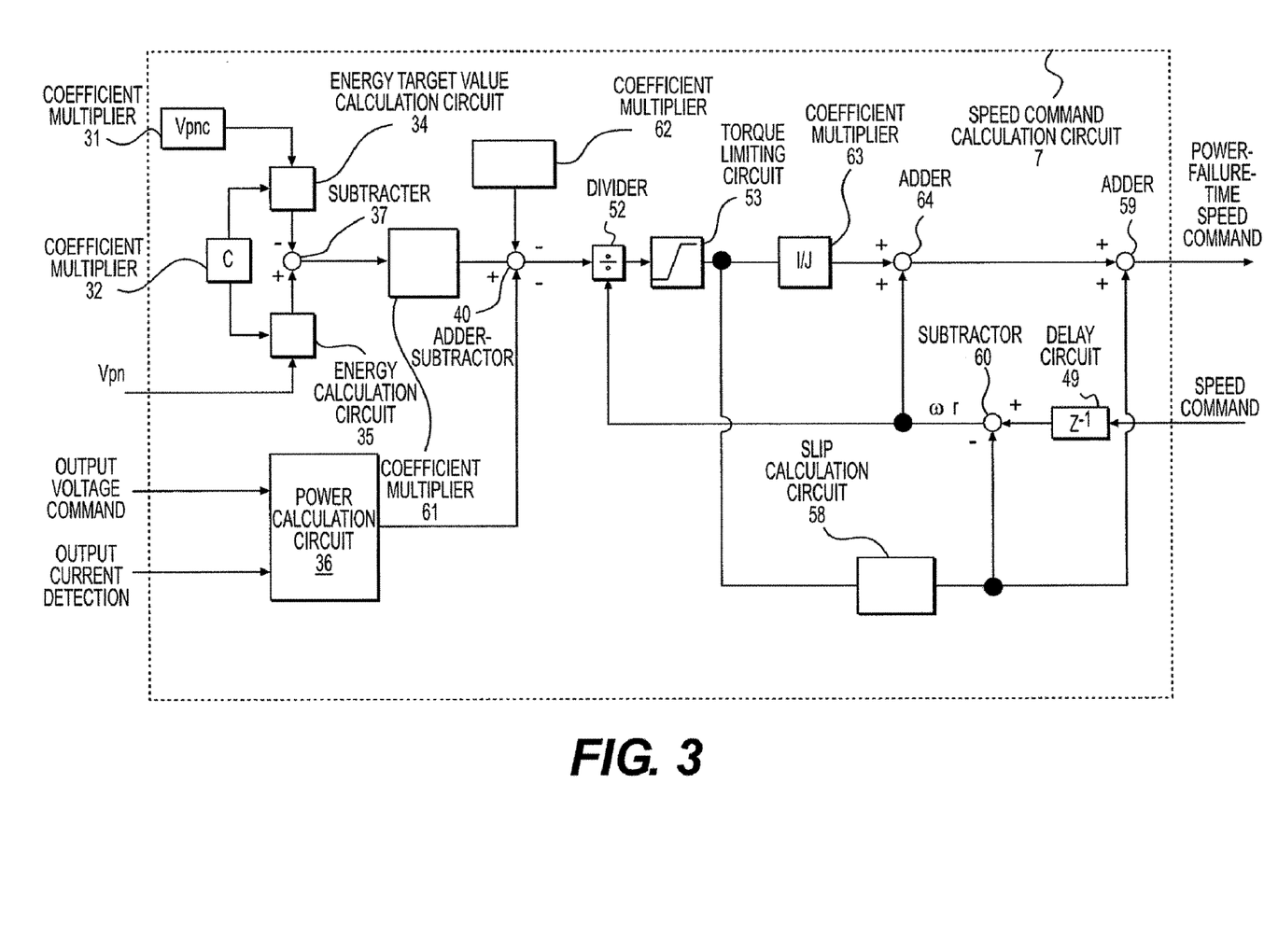
FIG. 3 is a block diagram of a speed command calculation circuit 7 according to the first embodiment of the present invention.

FIG. 3 is a block diagram of the speed command calculation circuit 7 for calculating the power-failure-time speed command. In FIG. 3, the speed command calculation circuit 7 has coefficient multipliers 31 and 32 for setting the target voltage Vpnc across the terminals of the smoothing capacitor 2 and the capacitance C of the smoothing capacitor 2, an energy target value calculation circuit 34 for calculating the target value of the energy stored in the smoothing capacitor 2, an energy calculation circuit 35 for calculating the energy stored in the smoothing capacitor 2, a power calculation circuit 36, a subtracter 37, an adder-subtracter 40, a delay circuit 49, a divider 52, a torque limiting circuit 53, a slip calculation circuit 58, an adder 59, a subtracter 60, coefficient multipliers 61, 62 and 63 and an adder 64; the energy target value calculation circuit 34 calculates $(C \times Vpnc^2)/2$ using the outputs of the coefficient multipliers 31 and 32, and the energy calculation circuit 35 calculates $(C \times Vpn^2)/2$ using the output of the coefficient multiplier 31 and the terminal voltage Vpc of the smoothing capacitor 2 delivered from the voltage detection circuit 5, and the power calculation circuit 36 calculates power output P on the basis of the inverter output current detection value obtained at the current detection circuit 4 and the voltage command value delivered from the voltage command calculation circuit 8.

A proportional gain for making the target value and the present value of the stored energy, delivered from the energy target value calculation circuit 34 and the energy calculation circuit 35, coincident with each other is set in the coefficient multiplier 61, and the output of the coefficient multiplier 61 becomes a power output target value Pref. The total value of the power loss in the machine including the inverter controller 20 and the AC power 13 is set in the coefficient multiplier 62, and a gain corresponding to a coefficient for the conversion from a torque, which is obtained by using the inverse of the moment of inertia J of the entire load including the AC power 13 as a guide, into an acceleration value is set in the coefficient multiplier 63.

Next, the operation for calculating the power-failure-time speed command in the speed command calculation circuit 7 will be described.

The difference between the target value $(C \times Vpnc^2)/2$ and the present value of the above-mentioned stored energy is obtained using the subtracter 37 and multiplied by the gain to obtain a power output target value Pref. This power output target value Pref is corrected by the power loss value in the machine including the inverter controller 20 and the AC power 13 using the adder-subtracter 40, and the difference between the corrected value and the power output P obtained by the calculation of the power calculation circuit 36. The difference is divided by the speed information $\omega r\hat{}$ of the AC power 13 using the divider 52 to obtain a torque target value Tref. This torque target value Tref is limited using the torque limiting circuit 53, converted into an acceleration command using the gain set in the coefficient multiplier and added to the present speed command $\omega r\hat{}$ using the adder 54 to obtain the power-failure-time speed command.

Although the power loss value of the machine including the inverter controller 20 and the AC power 13 is set as a set value in the coefficient multiplier 62 in the above-mentioned description, the power loss value may be strictly represented as a function of the output current or the like of the inverter and incorporated.

Furthermore, in the case that the motor to be used is an induction motor, it may also be possible that the slip frequency is calculated with the slip calculation circuit 58 using the output value of the torque limiting circuit 53, the speed command is subjected to slip compensation using the adder 59 and the subtracter 60, and the input/output speed commands of the speed command calculation circuit 7 are used as the primary frequency commands of the induction motor so that the delay time until the planned regenerative electric power is obtained is shortened.

Moreover, although the speed information $\omega r\hat{}$ of the AC power 13 is obtained using the speed command output at the last time, in the case that a circuit for detecting or estimating the speed is incorporated, the detected value or the estimated value of the speed may also be used.

Although the configuration is attained in all the considerations of the power loss in the inverter controller 20, the power loss in the machine including the AC power 13 and the compensation for slip frequency in the case that the motor to be used is an induction motor, any one of these considerations or any combination of the multiple considerations may be added. Even in such a case, the respective effects remain unchanged.

As described above, a loop for controlling the power output of the inverter controller 20 is formed inside a loop for determining a deceleration command on the basis of the target voltage Vpnc and the detection voltage Vpn of the smoothing capacitor 2 to control the terminal voltage of the smoothing capacitor 2; furthermore, the power output target value is calculated in consideration of the power loss value of the machine including the inverter controller 20 and the AC power 13, and the torque target value is limited using the torque limiting circuit 53.

With the operation described above, the terminal voltage of the smoothing capacitor 2 can be rapidly converged to the target value; even in the state that the target voltage and the detection voltage of the smoothing capacitor 2 are coincident with each other, smooth deceleration operation can be performed, and unnecessary deceleration stop and deceleration are not repeated. Furthermore, since excessive torque generation can be prevented, machines to be used can be protected.

Next, continued operation during power failure detection in the inverter controller 20 according to this embodiment will be described using FIGS. 1, 2 and 3 and FIG. 4, a time chart at the time of occurrence of a power failure.

Figure 4:
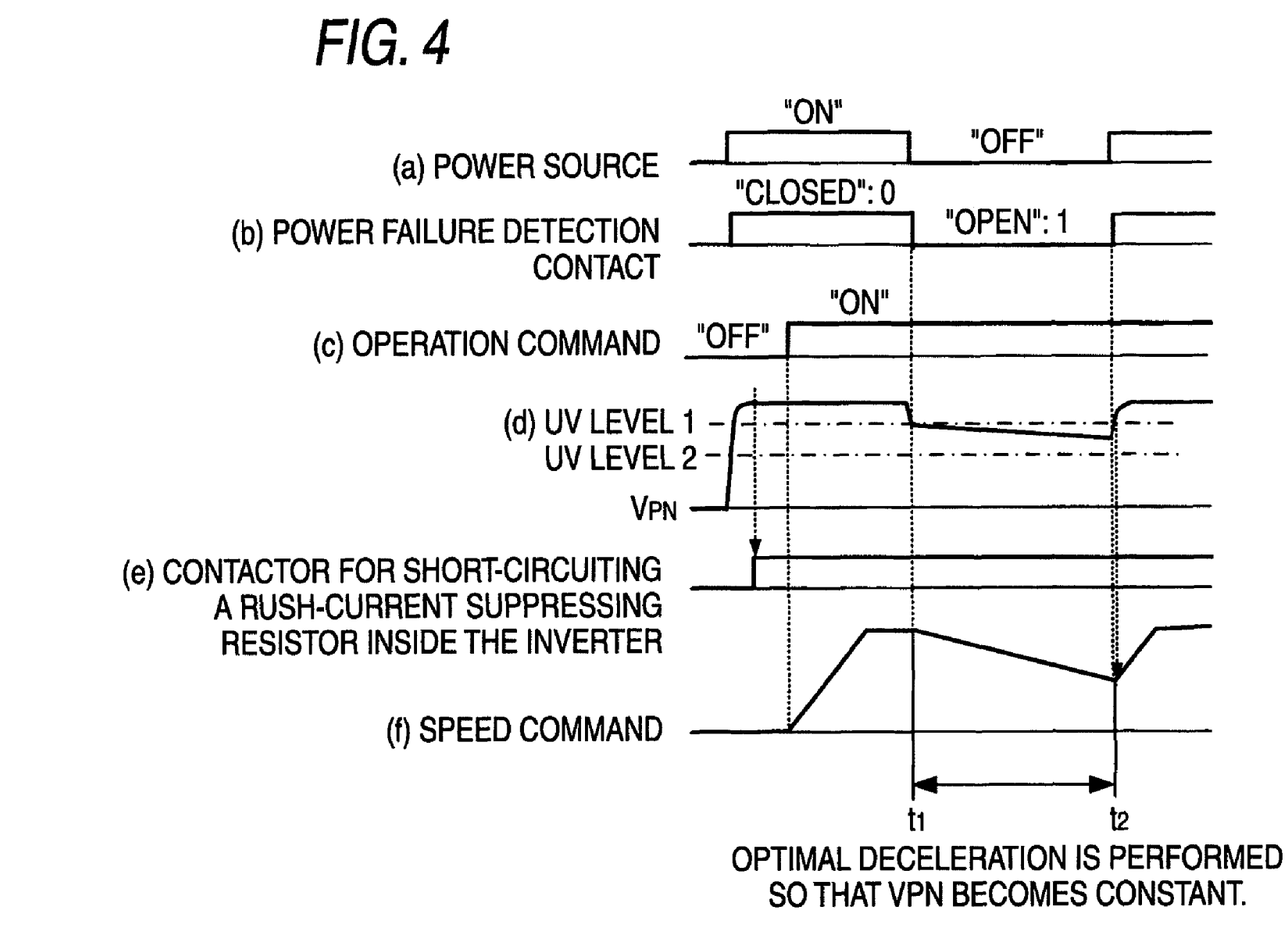
FIG. 4 is a time chart at the time of occurrence of a power failure.

FIG. 4(a) shows the ON/OFF states of the AC power source, FIG. 4(b) shows the open/closed states of the power failure detection contacts, and FIG. 4(c) shows the state of the operation command, FIG. 4(d) shows the change in the terminal voltage Vpn of the smoothing capacitor 2, and FIG. 4(f) shows the speed command of the inverter controller 20.

If an instantaneous power failure occurs in the AC power source, the terminal voltage Vpn of the smoothing capacitor 2 detected using the voltage detection circuit 5 drops to an undervoltage detection level (UV level 1) or less, or the electromagnetic contactor 11 opens. The power failure is detected at the timing of the voltage drop or the open operation, whichever is earlier. When the power failure is detected, the speed command selection circuit 6 switches the speed command from the ordinary-time speed command to the power-failure-time speed command using the switch circuit 21.

Since the terminal voltage Vpn of the smoothing capacitor 2 becomes lower than the preset value of the coefficient multiplier 31, i.e., the target voltage Vpnc, because of the power failure, the power-failure-time speed command calculated using the speed command calculation circuit 7 is issued to perform deceleration, and the AC motor 13 starts deceleration; regenerated energy depending on the rate of the deceleration and the moment of inertia J of a load charges the smoothing capacitor 2 via the inverter circuit 3 and raises the terminal voltage Vpn. At this time, strictly speaking, there is a decrease corresponding to the power loss in the inverter controller 20 and the power loss in the machine including the AC power 13.

On the other hand, when the power failure detection signal, i.e., the output signal of the OR circuit 23, becomes "1", the speed command selection circuit 6 transmits a power failure signal to the speed command calculation circuit 7. The speed command calculation circuit 7 calculates the power-failure-time speed command by performing the above-mentioned calculation operation, delivers the speed command to the voltage command calculation circuit 8 to decelerate the AC motor 13.

Furthermore, in the case that the rate of the deceleration is gentle and the terminal voltage Vpn of the smoothing capacitor 2 becomes lower than the target voltage Vpnc, or conversely, in the case that the terminal voltage Vpn becomes higher, a deviation occurs between the power output target value Pref and the power output P; the speed command is rapidly controlled on the basis of the deviation, and control is performed so that the terminal voltage Vpn becomes coincident with the target voltage Vpnc.

If the instantaneous power failure of the AC power source is recovered before the AC motor 13 is decelerated and stopped, the terminal voltage Vpn of the smoothing capacitor 2 rises to the undervoltage detection level (UV level 1) or more, the electromagnetic contactor 11 is closed, the power failure detection signal shown in FIG. 2 becomes "0" and the speed command is switched to the speed command for normal operation; hence, until the speed command setting value is reached, acceleration or deceleration is performed while taking the acceleration/deceleration time required for normal operation.

With the configuration described above, when an instantaneous power failure occurs in the AC power source, the power-failure-time speed command is selected, deceleration operation is performed, and the regenerated energy produced by this operation charges the smoothing capacitor 2 and raises the terminal voltage Vpn; hence, the AC motor 13 is decelerated and can be operated continuously until it stops while the voltage is prevented from becoming low; when the instantaneous power failure of the AC power source is recovered, the speed command is switched to the speed command for normal operation, whereby the speed command for performing acceleration or deceleration while taking the acceleration/deceleration time required for normal operation is issued until the speed command setting value is reached; as a result, operation can be continued stably even if an instantaneous power failure occurs.

A second embodiment according to the present invention will be described below referring to the drawings.

Embodiment 2

Figure 5:
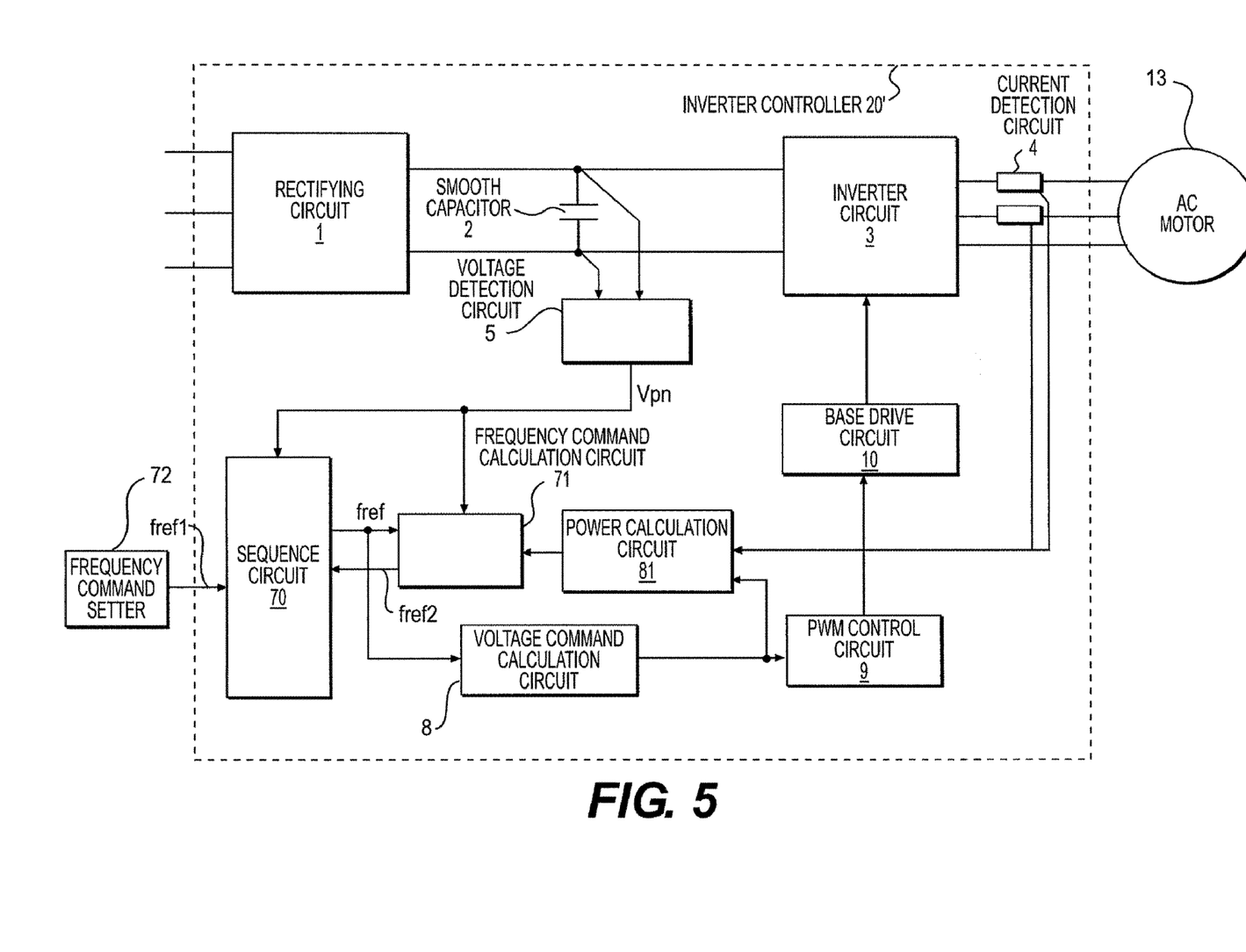
FIG. 5 is an outline configuration diagram showing the whole of an inverter controller according to a second embodiment of the present invention.

FIG. 5 is an outline configuration diagram showing the whole of an inverter controller 20' according to Embodiment 2 of the present invention. In FIG. 5, numeral designates a rectifying circuit, numeral 2 designates a smoothing capacitor, numeral 3 designates an inverter circuit, numeral 4 designates a current detection circuit, numeral 5 designates a voltage detection circuit, numeral 8 designates a voltage command calculation circuit, numeral 9 designates a PWM control circuit, and numeral 10 designates a base drive circuit; these circuits perform operations similar to those of the circuits of the inverter controller 20 shown in FIG. 1; numeral 81 designates a power calculation circuit for calculating the power output of the inverter, numeral 71 designates a frequency command calculation circuit for calculating a frequency command 2 (fref2) on the basis of the outputs of the voltage detection circuit 5 and the power calculation circuit 81, and numeral 70 designates a sequence circuit for detecting that the output of the voltage detection circuit 5 has exceeded a reference value and for setting the output (fref2) of the frequency command calculation circuit 71 as a frequency command (fref).

Furthermore, numeral 72 designates a frequency command setter for outputting a frequency command 1 (fref1) serving as the frequency command during normal operation, and numeral 13 designates an AC motor (hereafter described as an induction motor) serving as a load. The frequency command setter 72 incorporates a soft start function for converting the frequency command into a command with an acceleration/deceleration rate.

The present invention is different from the prior art in that the present invention is provided with the sequence circuit 70 and the frequency command calculation circuit 71; the frequency command calculation circuit 71 is provided with a loop for controlling the power output of the inverter controller 20' inside a loop for determining a deceleration command on the basis of the target voltage Vpnc and the detection voltage Vpn of the smoothing capacitor 2 and is further provided with a torque limiting circuit 87 for limiting the torque target value.

Figure 6:
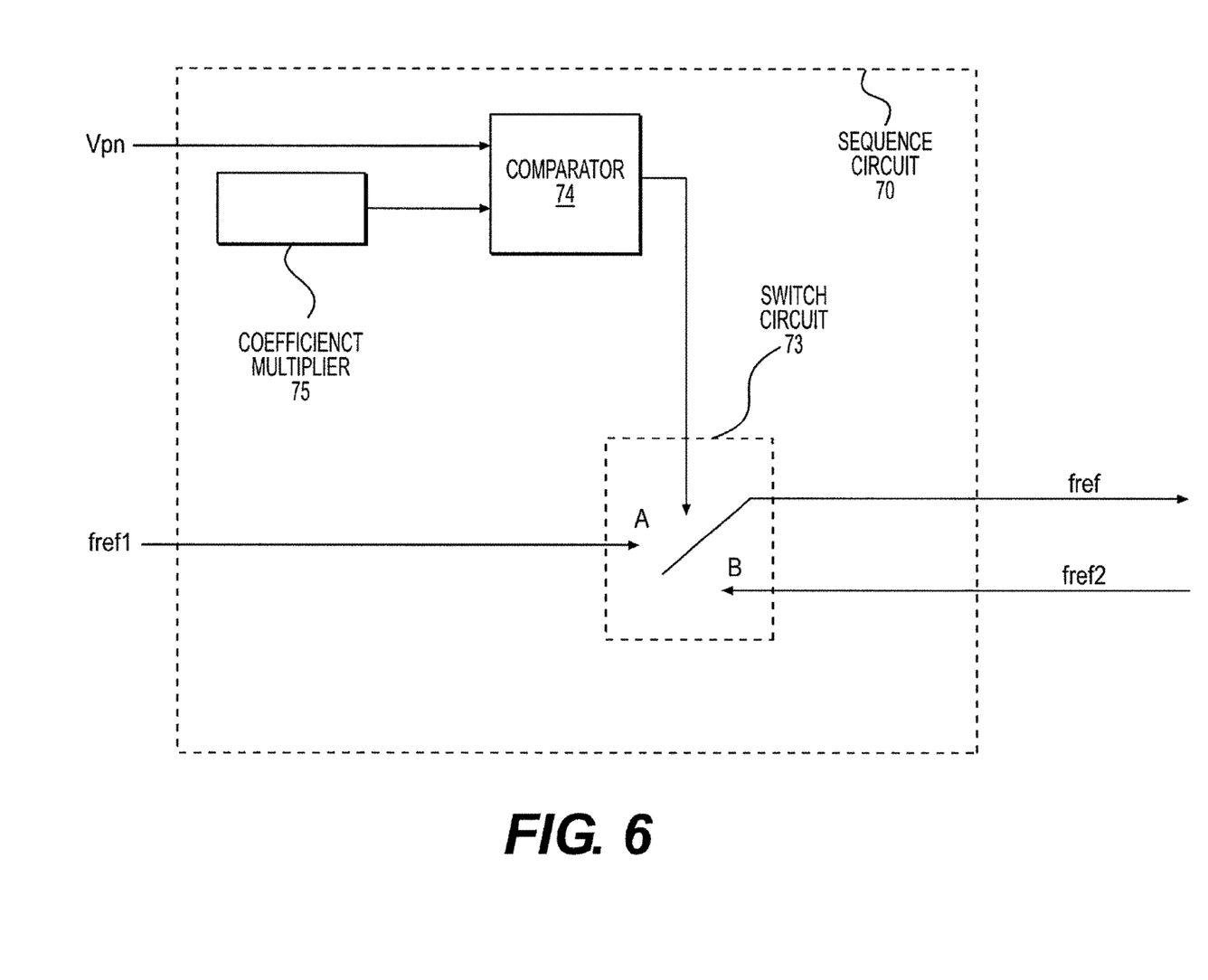
FIG. 6 is a block diagram of a sequence circuit 70 according to the second embodiment of the present invention.

FIG. 6 is a block diagram of the sequence circuit 70. In FIG. 6, numeral 73 designates a switch circuit, numeral 74 designates a comparator, and numeral 75 designates a coefficient multiplier.

On the basis of the terminal voltage of the smoothing capacitor, the coefficient multiplier 75 sets a threshold value for determining whether the normal operation or the overvoltage preventing operation is performed. This set value is a value larger than the obtainable terminal voltage value of the smoothing capacitor during normal operation.

Figure 7:
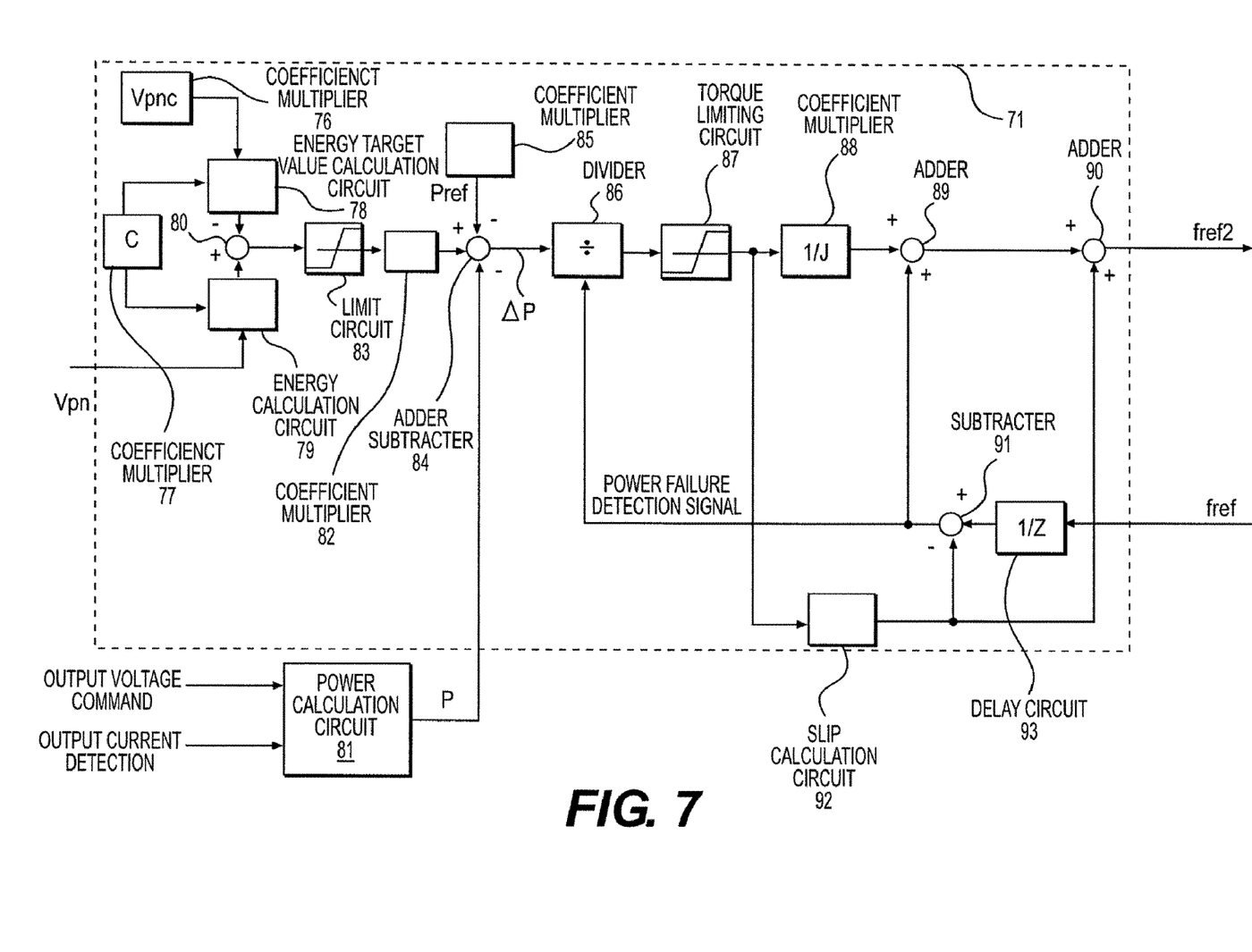
FIG. 7 is a block diagram of a frequency command calculation circuit 71 according to the second embodiment of the present invention.

FIG. 7 is a block diagram of the frequency command calculation circuit 71. In FIG. 7, numerals 76 and 77 designate coefficient multipliers, numeral 78 designates an energy target value calculation circuit, numeral 79 designates an energy calculation circuit, numeral 80 designates a subtracter, numeral 81 designates a power calculation circuit, numeral 82 designates a coefficient multiplier, numeral 83 designates a limit circuit, numeral 84 designates an adder-subtracter, numeral 85 designates a coefficient multiplier, numeral 86 designates a divider, numeral 87 designates a torque limiting circuit, numeral 88 designates a coefficient multiplier, numerals 89 and 90 designate adders, numeral 91 designates a subtracter, numeral 92 designates a slip calculation unit, and numeral 93 designates a delay circuit.

In this figure, the target value Vpnc of the terminal voltage of the smoothing capacitor 2 is set in the coefficient multiplier 76, the capacitance C of the smoothing capacitor 2 is set in the coefficient multiplier 77, a control gain for controlling the output value of the subtracter 80 to zero is set in the coefficient multiplier 82, the total value of the loss value in the inverter controller 20' and the loss value in the machine including the switch circuit 13 is set in the coefficient multiplier 85, and 1/J (J is the moment of inertia of the entire load including the AC power 13) is set in the coefficient multiplier 88.

In addition, a value that is equal to or larger than the reference value of the terminal voltage of the smoothing capacitor, the set value of the coefficient multiplier 75, is set as Vpnc, the set value of the coefficient multiplier 76.

The operation of the inverter controller 20' according to the present invention will be described using FIGS. 5 to 7.

The terminal voltage of the smoothing capacitor 2 is raised by the regenerated energy that is derived from the AC motor 13 when the output frequency f is lowered using the deceleration command or when a regenerative load is applied.

The sequence circuit 70 compares the voltage detection value Vpn of the smoothing capacitor detected using the voltage detection circuit 5 with the set value of the coefficient multiplier 75; at the time of Vpn>(the set value of the coefficient multiplier 75), the switch circuit 73 is switched from the side A to the side B, whereby the frequency command is switched from the frequency command 1 (fref1), the output of the frequency command setter 72, to the frequency command 2 (fref 2), the output of the frequency command calculation circuit 71, and the frequency command 2 (fref2) is output as the frequency command (fref).

The voltage command calculation circuit 8 calculates an output voltage command on the basis of the frequency command (fref) delivered from the sequence circuit 70, the PWM control circuit 9 outputs a signal to the base drive circuit 10 on the basis of the output signal delivered from the voltage command calculation circuit 8, and the base drive circuit 10 drives the inverter circuit 3 on the basis of the output signal from the PWM control circuit 9.

Next, the method for calculating the frequency command 2 (fref2) that is selected at the time of Vpn>(the set value of the coefficient multiplier 75) will be described.

The energy target value calculation circuit 78 calculates the energy target value $(C \times Vpnc^2)/2$ stored in the smoothing capacitor 2 using the set values of the coefficient multipliers 76 and 77, and the energy calculation circuit 79 calculates the energy value $(C \times Vpn^2)/2$ actually stored in the smoothing capacitor 2 using the output value of the coefficient multiplier 77 and the terminal voltage detection value Vpn of the smoothing capacitor 2 delivered from the voltage detection circuit 5.

The subtracter 80 subtracts the output value of the energy target value calculation circuit 78 from the output value of the energy calculation circuit 79 and outputs an energy deviation, the limit circuit 83 limits the output value of the subtracter 80 to the lower limit value zero, and the output value of the limit circuit 83 is multiplied by the set value of the coefficient multiplier 82 to obtain the power output target value Pref. The reason why the limit circuit 83 limits the above-mentioned energy deviation to the lower limit value zero is to prevent the operation from being performed in the deceleration direction, for example, due to the fluctuation in the terminal voltage of the smoothing capacitor.

The power calculation circuit 81 calculates the power output value P of the inverter controller using the inverter output current detection value obtained using the current detection circuit 4 and the output voltage command value delivered from the output voltage command calculation circuit 8. The adder-subtracter 84 subtracts the above-mentioned power output value P from the above-mentioned power output target value Pref and further subtracts the set value of the coefficient multiplier 85 and then outputs a power deviation ΔP.

The divider 86 calculates the torque target value by dividing the above-mentioned power deviation ΔP by the speed f of the AC motor 13 described later. The torque limiting circuit 87 limits the torque target value by a value determined in consideration of machine protection. The output value of the torque limiting circuit 87 is multiplied by the set value of the coefficient multiplier 88, and an acceleration target value is obtained.

Furthermore, the slip calculation circuit 92 calculates a slip frequency using the output value of the torque limiting circuit 87. The subtracter 91 subtracts the slip frequency from the frequency command (fref) output from the delay circuit 93 at the last time and outputs the speed f of the AC motor 13. The adder 89 adds the speed f of the AC motor 13 to the acceleration target value output from the coefficient multiplier 88 and further adds the slip frequency output from the slip calculation circuit 92, thereby obtaining the frequency command (fref2).

As described above, the power output target value Pref is calculated using the target voltage Vpnc of the terminal voltage of the smoothing capacitor 2 and the detection value Vpn thereof, and the power output target value Pref is corrected in consideration of the power loss value of the machine including the inverter controller 20' and the AC motor 13, whereby the frequency command 2 (fref2) at which the deviation ΔP between the power output target value Pref and the power output P becomes 0 is calculated.

At the time of Vpn<(the set value of the coefficient multiplier 75), the switch circuit 73 is switched from the side B to the side A; in other words, the frequency command (fref) is switched from the frequency command 2 (fref2) output from the frequency command calculation circuit 71 to the frequency command 1 (fref1) output from the frequency command setter 72, and normal operation is restored.

Since the minor loop for controlling the power output is configured, the torque target value is limited to the predetermined value, and slip frequency compensation is performed as described above, the terminal voltage of the smoothing capacitor is converged to the target value rapidly and securely, smooth operation can be performed without repeating unnecessary acceleration/deceleration and deceleration stop, machines to be used can be protected by preventing excessive torque generation, and the delay time until the planned power output is obtained can be shortened.

The AC motor 13 can perform not only regenerative operation but also electromotive (powering) operation depending on the sign of the energy deviation between the power output value P and the value output from the coefficient multiplier 82. In the case that the power output value P is calculated for the electromotive (powering) operation, the present invention can be implemented more effectively by performing operation so that the adder-subtracter 84 adds the output of the coefficient multiplier 85.

In addition, although the loss value of the machine including the inverter controller 20' and the AC power 13 is set as a constant value serving as the set value of the coefficient multiplier 85, it is needless to say that the loss value is strictly represented by a function of the output current or the like of the inverter and incorporated.

Furthermore, although the speed f of the AC power 13 is obtained using the frequency command (fref) output at the last time, in the case that a circuit for detecting or estimating the speed is incorporated, the detected value or the estimated value of the speed may also be used.

Moreover, although the AC motor is described as an induction motor in the above-mentioned description, the present invention can also be implemented similarly even if an AC motor, such as a synchronous motor, is used instead of an induction motor. In that case, the output of the slip calculation circuit 92 should only be set to zero.

Besides, although the configuration has been described in consideration of the loss in the inverter controller and the loss in the machine including the AC power, in consideration of machine protection and in consideration of the compensation for slip frequency in the case that an induction motor is used, any one of these considerations or any combination of the multiple considerations may also be used. Even in such a case, the respective effects remain unchanged.

Still further, Embodiment 1 has been described using the speed command calculation circuit for calculating the speed command depending on the state during an instantaneous power failure or the output value of the voltage detection circuit on the basis of the power output target value and the power output value, and Embodiment 2 has been described using the frequency command calculation circuit for calculating the frequency command instead of using the speed command calculation circuit; however, even if a calculation circuit for calculating a frequency command is used in Embodiment 1 and a calculation circuit for calculating a speed command is used in Embodiment 2, the present invention can be implemented similarly.

INDUSTRIAL APPLICABILITY

The present invention is applicable to all inverter controllers for driving motors in which an instantaneous power failure may occur and regenerative operation may be performed and is also applicable to methods for operating the inverter controllers.

[FIG. 4]
A1 ON
A2 OFF
A3 CLOSED: 0
A4 OPEN: 1
A5 Optimal deceleration is performed so that Vpn becomes constant.
(a) Power source
(b) Power failure detection contact
(c) Operation command
(d) UV level 1
UV level 2
(e) Contactor for short-circuiting a rush-current suppressing resistor inside the inverter
(f) Speed command

The invention claimed is:

1. An inverter controller comprising:
an AC motor as a load,
a rectifying circuit for converting AC power from an AC power source into DC power,
a smoothing capacitor for smoothing a DC voltage from the rectifying circuit,
an inverter circuit for converting DC power supplied via the smoothing capacitor into a desired frequency,
a current detection circuit for detecting an output current of the inverter circuit,
a voltage detection circuit for detecting a terminal voltage (Vpn) of the smoothing capacitor,
a voltage command calculation circuit for calculating a voltage command to the AC motor,
a speed command calculation circuit for calculating a speed command to be used when it is determined that the AC power source is in a power failure state or when the terminal voltage (Vpn) reaches a certain value,
wherein the speed command calculation circuit includes:
a power calculation circuit for calculating a power output value (P) based on the output current and the voltage command, and
a power target calculation circuit for calculating a power output target value (Pref) based on the terminal voltage (Vpn), a previously-set target voltage (Vpnc) of the terminal voltage (Vpn) for the power failure state, and a capacity (C) of the smoothing capacitor, and
wherein the speed command calculation circuit calculates the speed command based on the power output target value (Pref) and the power output value (P).

2. The inverter controller according to claim 1, wherein the speed command calculation circuit calculates to correct the power output target value by adding or subtracting a power loss value of the inverter controller on the basis of a sign of the power output value.

3. The inverter controller according to claim 1, wherein the speed command calculation circuit calculates to correct the power output target value by adding or subtracting the power loss value of a machine including the AC motor on the basis of a sign of the power output target value.

4. The inverter controller according to claim 1, wherein the speed command calculation circuit calculates to correct a torque target value by calculating the torque target value using a deviation between the power output target value and the power output value and the speed command output at the last time.

5. The inverter controller according to claim 1, wherein the speed command calculation circuit limits a torque target value that is obtained on a basis of the power output target value and a speed information of the AC motor.

6. The inverter controller according to claim 1, wherein the speed command calculation circuit corrects a slip speed command by calculating the slip speed command using a torque target value that is obtained on a basis of the power output target value and a speed information of the AC motor in the case that the AC motor is an induction motor.

7. The inverter controller according to claim 1, further comprising:
a frequency command calculation circuit for calculating a frequency command of the AC motor instead of the speed command calculation circuit.

8. An operation method for coping with fluctuation or instantaneous power failure of an AC power source for an inverter controller comprising: an AC motor as a load, a rectifying circuit for converting AC power from an AC power source into DC power, a smoothing capacitor for smoothing a DC voltage from the rectifying circuit, an inverter circuit for converting DC power supplied via the smoothing capacitor into a desired frequency, a current detection circuit for detecting an output current of the inverter, and a voltage detection circuit for detecting a terminal voltage of the smoothing capacitor,
the operation method comprising the steps of:
calculating the power output value of the inverter controller,
calculating the power output target value on the basis of the terminal voltage and the power output value, and
calculating a speed command used during an instantaneous power failure on the basis of the power output target value and the power output value or a speed command depending on the output value of the voltage detection circuit.

* * * * *